US010486589B2

(12) United States Patent
Lee

(10) Patent No.: US 10,486,589 B2
(45) Date of Patent: Nov. 26, 2019

(54) AIRCRAFT WINDOW SIDEWALL PANEL ILLUMINATION SYSTEMS AND METHODS

(71) Applicant: THE BOEING COMPANY, Chicago, IL (US)

(72) Inventor: Sunghoon Lee, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/895,029

(22) Filed: Feb. 13, 2018

(65) Prior Publication Data

US 2019/0248282 A1 Aug. 15, 2019

(51) Int. Cl.

| | |
|---|---|
| ***B60Q 3/208*** | (2017.01) |
| ***B60Q 3/43*** | (2017.01) |
| ***B60Q 3/53*** | (2017.01) |
| ***B60Q 3/85*** | (2017.01) |
| ***B64D 47/02*** | (2006.01) |
| ***B60Q 3/47*** | (2017.01) |
| *B64D 11/00* | (2006.01) |

(52) U.S. Cl.

CPC ................ *B60Q 3/43* (2017.02); *B60Q 3/47* (2017.02); *B60Q 3/53* (2017.02); *B60Q 3/85* (2017.02); *B64D 47/02* (2013.01); *B64D 2011/0038* (2013.01)

(58) Field of Classification Search

CPC ........ B60Q 3/208; B60Q 1/268; B60Q 1/302; F21S 4/20; F21S 4/28; F21W 2107/30

USPC .......................................................... 362/503

See application file for complete search history.

(56) References Cited

U.S. PATENT DOCUMENTS 1,674,340 A * 6/1928 Nock ...................... F21S 41/00 362/503
1,906,568 A * 5/1933 Garvin .................. B60Q 1/486 362/293
3,156,415 A * 11/1964 Walker ..................... B60Q 3/74 296/215
4,916,593 A * 4/1990 Moss ..................... B60Q 1/302 362/503
7,537,361 B2 * 5/2009 Jugovic ................. B64C 1/1484 244/129.3
8,162,519 B2 * 4/2012 Salter ....................... B60Q 3/54 362/488
8,317,378 B2 * 11/2012 Dixon ...................... B60Q 3/82 362/276
8,466,438 B2 * 6/2013 Lambert ................ B60K 35/00 250/461.1
9,527,437 B2 12/2016 Valentine
9,902,314 B1 * 2/2018 Salter ..................... B60Q 1/268
9,937,855 B2 * 4/2018 Dellock ..................... F21V 9/30
10,059,259 B2 * 8/2018 Cannon .................... B60Q 3/54
2008/0266887 A1 * 10/2008 Wentland ............... B64C 1/066 362/470
2015/0343944 A1 * 12/2015 Salter ................ H05B 37/0218 362/510

* cited by examiner

*Primary Examiner* — Ismael Negron

(74) *Attorney, Agent, or Firm* — Joseph M. Butscher; The Small Patent Law Group, LLC

(57) ABSTRACT

An illuminating system includes a lighting assembly with at least one light emitting diode, a window provided in a sidewall panel of a vehicle cabin, at least one light transmissive panel with indicia, and a control unit for controlling operation of the lighting assembly. The lighting assembly mounted proximate a side of window in the sidewall panel and configured to emit light onto the sidewall panel and/or the indicia.

20 Claims, 7 Drawing Sheets

Vehicle
Internal Cabin
Illuminating Sidewall System
Sidewall Panel
Lighting Control Unit
Lighting Assembly
Window
200 202 204 206 208 209 210 211 212 213 214 215 216 217 218 219 220 $d_1$ $d_2$

AIRCRAFT WINDOW SIDEWALL PANEL ILLUMINATION SYSTEMS AND METHODS

FIELD OF EMBODIMENTS OF THE DISCLOSURE

Embodiments of the present disclosure generally relate to sidewall panels within an internal cabin of a vehicle, and, more particularly, to illuminating sidewall systems.

BACKGROUND OF THE DISCLOSURE

Commercial aircraft typically include an internal cabin that may be divided into numerous sections. A cockpit is generally separated from a passenger cabin, which may include a first class section, a business class section, and a coach section. The passenger cabin may also include one or more work areas for flight personnel, such as galleys, which may include food and beverage storage structures. One or more aisles pass through the passenger cabin and connect each of the passenger sections to one or more paths to one or more doors of the aircraft.

The internal cabin is typically defined by interior sidewalls that connect to a ceiling and a floor. The sidewalls include windows that allow passengers to see outside of the aircraft.

Certain airline providers may prefer to customize portions of the sidewalls with graphics, for example. In at least some situations, it may be desired to change such customized features during or between flights, for example.

However, various known sidewalls within aircraft are not configured to be adaptively changed. Moreover, certain passengers may find sidewalls within aircraft to be aesthetically sterile and plain.

SUMMARY OF THE DISCLOSURE

A need exists for a system and method of adaptively modifying sidewalls within an internal cabin of a vehicle. Further, a need exists for a system and method that allows for adaptive customization of portions of sidewalls within an internal cabin of an aircraft.

With those needs in mind, certain embodiments of the present disclosure provide an illuminating sidewall system for an internal cabin of a vehicle. The illuminating sidewall system includes a sidewall panel including at least one window, and a lighting assembly (which may include one or more light emitting diodes) mounted in relation to the sidewall panel to a side of the window(s). The lighting assembly is configured to emit light onto the sidewall panel towards the side of the window(s).

The lighting assembly may be vertically oriented. In at least one embodiment, the lighting assembly is spaced apart from the side of the window(s). The lighting assembly may extend a first distance above a top of the window and/or a second distance below a bottom of the window. The lighting assembly may be disposed at or towards a fore end or an aft end of the sidewall panel. In at least one embodiment, the lighting assembly is separate and distinct from a personal service unit.

In at least one embodiment, the lighting assembly is securely retained within a channel formed in the sidewall panel. The lighting assembly may be inwardly recessed from a scalloped internal edge of the sidewall panel.

The sidewall panel may include at least one light-transmissive indicia. At least a portion of the lighting assembly may be positioned behind the light-transmissive indicia. The lighting assembly may be configured to emit the light through the light-transmissive indicia.

The illuminating sidewall system may also include a lighting control unit that is coupled to the lighting assembly. The lighting control unit is configured to control operation of the lighting assembly.

Certain embodiments of the present disclosure provide an illuminating sidewall method for an internal cabin of a vehicle. The illuminating sidewall method includes providing a sidewall panel including at least one window, mounting a lighting assembly in relation to the sidewall panel to a side of the window(s), and emitting light from the lighting assembly onto the sidewall panel towards the side of the window(s).

Certain embodiments of the present disclosure provide a vehicle including an internal cabin, and an illuminating sidewall system within the internal cabin.

DETAILED DESCRIPTION OF THE DISCLOSURE

Figure 1:
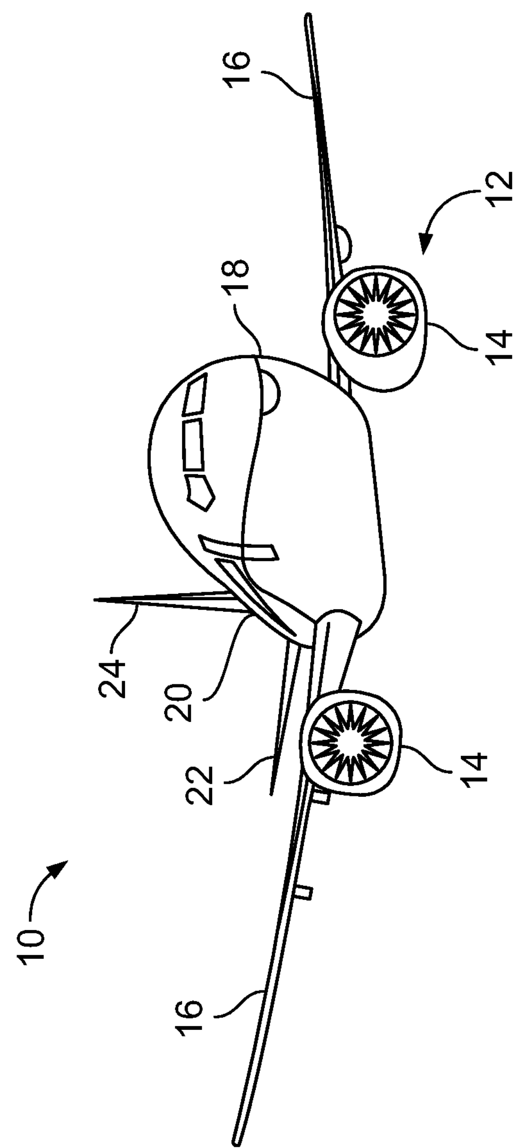
FIG. 1 illustrates a perspective front view of an aircraft, according to an embodiment of the present disclosure.

The foregoing summary, as well as the following detailed description of certain embodiments will be better understood when read in conjunction with the appended drawings. As used herein, an element or step recited in the singular and preceded by the word “a” or “an” should be understood as not necessarily excluding the plural of the elements or steps. Further, references to “one embodiment” are not intended to be interpreted as excluding the existence of additional embodiments that also incorporate the recited features. Moreover, unless explicitly stated to the contrary, embodiments “comprising” or “having” an element or a plurality of elements having a particular property may include additional elements not having that property.

Embodiments of the present disclosure provide an illuminating sidewall system including a sidewall panel having a vertically-oriented, recessed lighting assembly. The lighting assembly may be secured within a scalloped edge of the sidewall panel.

Embodiments of the present disclosure provide an illuminating sidewall system for an internal cabin of a vehicle, such as a commercial aircraft. The illuminating sidewall system includes a lighting assembly coupled to a sidewall panel. The lighting assembly is positioned to a side of a window of the sidewall panel. The lighting assembly includes one or more light-emitting elements (such as light-emitting diodes) that may be controlled to provide a plurality of lighting effects. For example, the light-emitting elements may be operated to selectively change a color of emitted light. In at least one embodiment, the light-emitting elements are configured to emit light over a color range including red-orange-yellow-green-blue-indigo-violet, and mixtures of light therebetween. The lighting assembly may be operatively coupled to a lighting control unit that is configured to control the operation of the lighting assembly.

The lighting assembly may be operated to provide adaptable lighting features that are emitted onto the sidewall panel to (for example, onto) a side of the window. The lighting features may be selectively modified and changed, depending on desired lighting within the internal cabin.

The illuminating sidewall system is configured to provide a selective warm and intimate setting within the internal cabin of the vehicle. Further, the illuminating sidewall system allows a provider to customize lighting and effects thereof for branding purposes. For example, an airline may select one or more colors that are associated with the airline. The illuminating sidewall system may be operated to illuminate such colors in relation to the sidewall panel.

In at least one embodiment, the sidewall panel may include light-transmissive indicia. For example, the light-transmissive indicia may include wayfinding characters such as seat numbers. Light emitted by the lighting assembly passes through the light-transmissive indicia, thereby illuminating the light-transmissive indicia. In at least one other embodiment, the light-transmissive indicia may include company names, slogans, or the like.

Embodiments of the present disclosure provide illuminating sidewall systems and methods that provide additional lighting options within an internal cabin, customizable lighting effects that allow for selectively adaptable lighting effects, and illuminated wayfinding features.

FIG. 1 illustrates a perspective top view of a vehicle, such as an aircraft 10, according to an embodiment of the present disclosure. The aircraft 10 includes a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin, which may be defined by interior sidewall panels that connect to a ceiling and a floor. The internal cabin may include a cockpit, one or more work sections (for example, galleys, personnel carry-on baggage areas, and the like), one or more passenger sections (for example, first class, business class, and coach sections), and an aft section in which an aft rest area assembly may be positioned. Each of the sections may be separated by a cabin transition area, which may include one or more class divider assemblies. Overhead stowage bin assemblies may be positioned throughout the internal cabin.

Alternatively, instead of an aircraft, embodiments of the present disclosure may be used with various other vehicles, such as automobiles, buses, locomotives and train cars, seacraft, spacecraft, and the like.

Figure 2A:
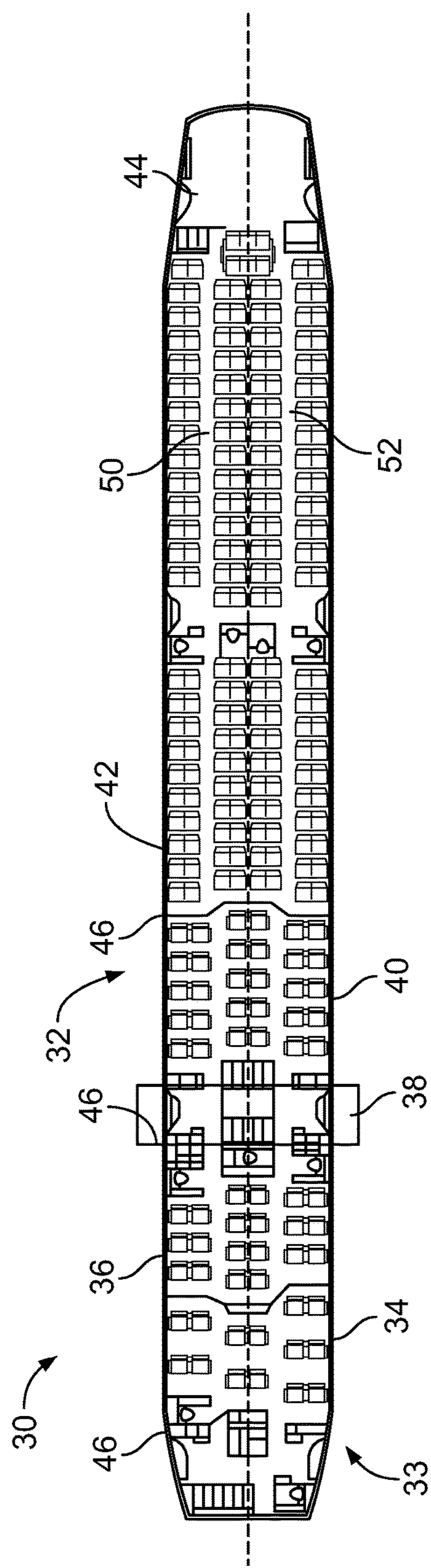
FIG. 2A illustrates a top plan view of an internal cabin of an aircraft, according to an embodiment of the present disclosure.

FIG. 2A illustrates a top plan view of an internal cabin 30 of an aircraft, according to an embodiment of the present disclosure. The internal cabin 30 may be within a fuselage 32 of the aircraft. For example, one or more fuselage walls may define an interior of the internal cabin 30. The interior of the internal cabin 30 is defined by sidewall panels that connect to a ceiling and a floor. The internal cabin 30 includes multiple sections, including a front section 33, a first class section 34, a business class section 36, a front galley station 38, an expanded economy or coach section 40, a standard economy or coach section 42, and an aft section 44, which may include multiple lavatories and galley stations. It is to be understood that the internal cabin 30 may include more or less sections than shown. For example, the internal cabin 30 may not include a first class section, and may include more or less galley stations than shown. Each of the sections may be separated by a cabin transition area 46.

As shown in FIG. 2A, the internal cabin 30 includes two aisles 50 and 52 that lead to the aft section 44. Optionally, the internal cabin 30 may have less or more aisles than shown. For example, the internal cabin 30 may include a single aisle that extends through the center of the internal cabin 30 that leads to the aft section 44.

Figure 2B:
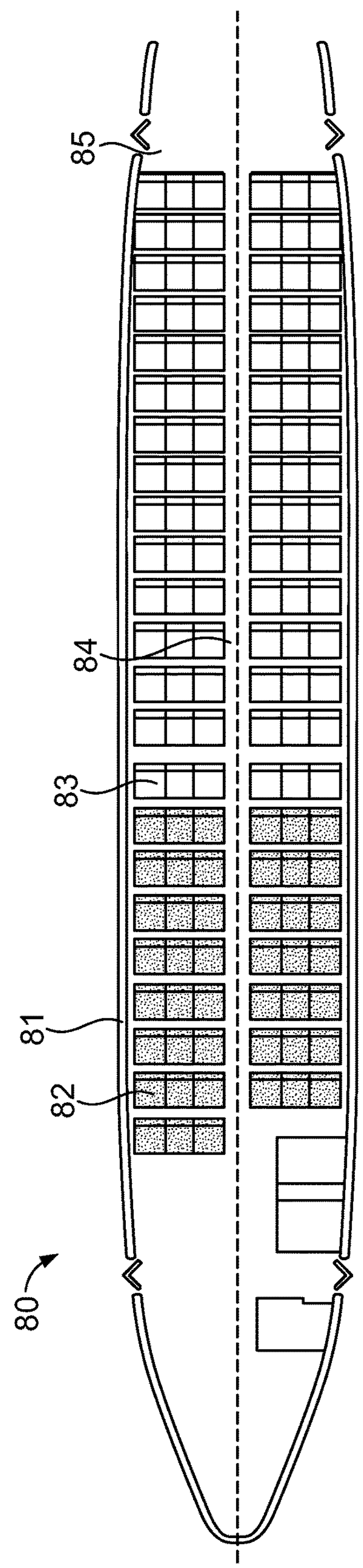
FIG. 2B illustrates a top plan view of an internal cabin of an aircraft, according to an embodiment of the present disclosure.

FIG. 2B illustrates a top plan view of an internal cabin 80 of an aircraft, according to an embodiment of the present disclosure. The internal cabin 80 may be within a fuselage 81 of the aircraft. For example, one or more fuselage walls may define the interior of the internal cabin 80. The internal cabin 80 includes multiple sections, including a main cabin 82 having passenger seats 83, and an aft section 85 behind the main cabin 82. It is to be understood that the internal cabin 80 may include more or less sections than shown.

The internal cabin 80 may include a single aisle 84 that leads to the aft section 85. The single aisle 84 may extend through the center of the internal cabin 80 that leads to the aft section 85. For example, the single aisle 84 may be coaxially aligned with a central longitudinal plane of the internal cabin 80.

Figure 3:
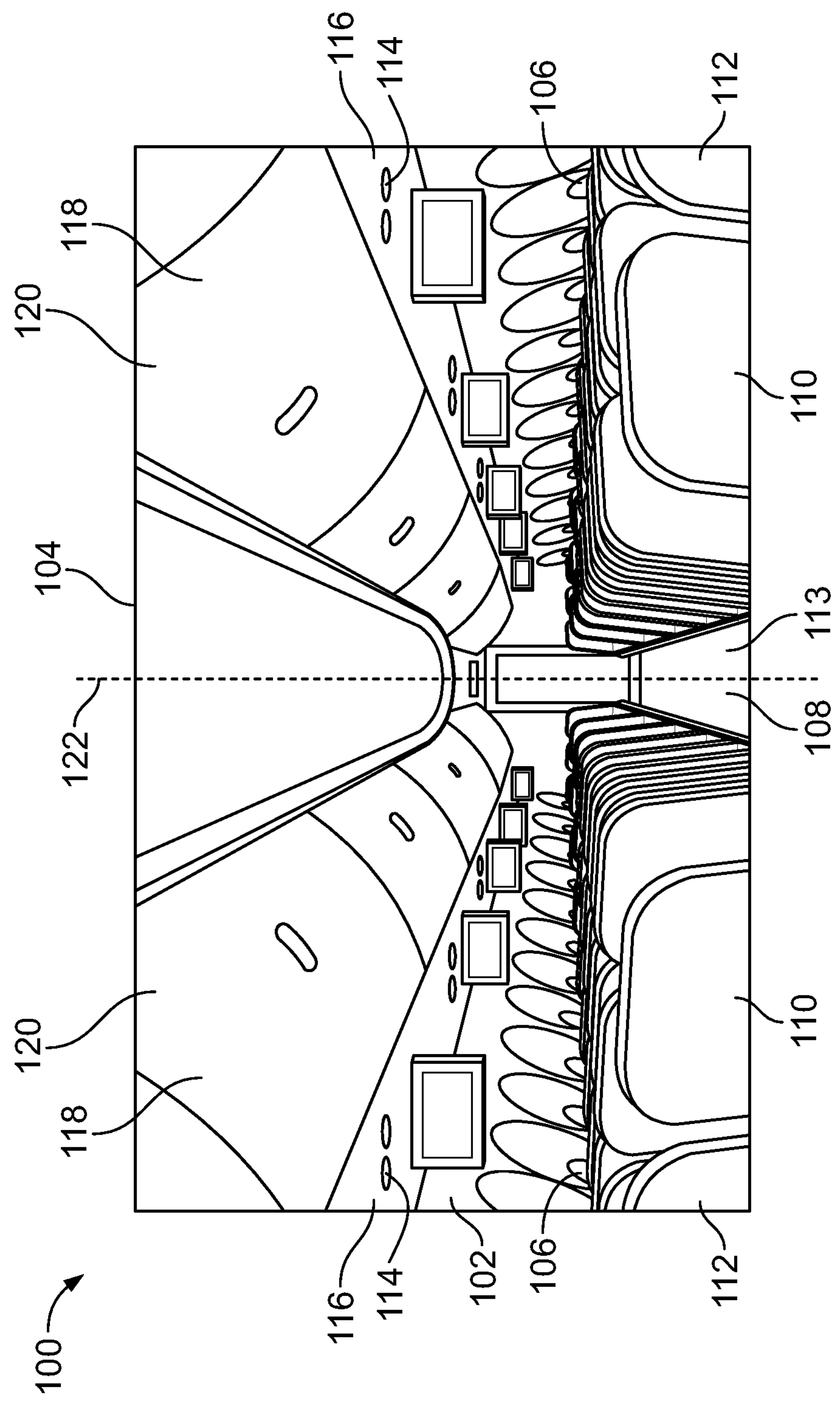
FIG. 3 illustrates a perspective interior view of an internal cabin of an aircraft, according to an embodiment of the present disclosure.

FIG. 3 illustrates a perspective interior view of an internal cabin 100 of an aircraft, according to an embodiment of the present disclosure. The internal cabin 100 includes outboard sidewalls 102 connected to a ceiling 104. Windows 106 may be formed within the outboard sidewalls 102. A floor 108 supports rows of seats 110. As shown in FIG. 3, a row 112 may include two seats 110 on either side of an aisle 113. However, the row 112 may include more or less seats 110 than shown. Additionally, the internal cabin 100 may include more aisles than shown.

Passenger service units (PSUs) 114 are secured between an outboard sidewall 102 and the ceiling 104 on either side of the aisle 113. The PSUs 114 extend between a front end and rear end of the internal cabin 100. For example, a PSU 114 may be positioned over each seat 110 within a row 112. Each PSU 114 may include a housing 116 that generally contains vents, reading lights, an oxygen bag drop panel, an attendant request button, and other such controls over each seat 110 (or groups of seats) within a row 112.

Overhead stowage bin assemblies 118 are secured to the ceiling 104 and/or the outboard wall 102 above and inboard from the PSU 114 on either side of the aisle 113. The overhead stowage bin assemblies 118 are secured over the seats 110. The overhead stowage bin assemblies 118 extend between the front and rear end of the internal cabin 100. Each stowage bin assembly 118 may include a pivot bin or bucket 120 pivotally secured to a strongback (hidden from view in FIG. 3). The overhead stowage bin assemblies 118 may be positioned above and inboard from lower surfaces of the PSUs 114. The overhead stowage bin assemblies 118 are configured to be pivoted open in order to receive passenger carry-on baggage and personal items, for example.

As used herein, the term "outboard" means a position that is further away from a central longitudinal plane 122 of the internal cabin 100 as compared to another component. The term "inboard" means a position that is closer to the central longitudinal plane 122 of the internal cabin 100 as compared to another component. For example, a lower surface of a PSU 114 may be outboard in relation to a stowage bin assembly 118.

Figure 4:
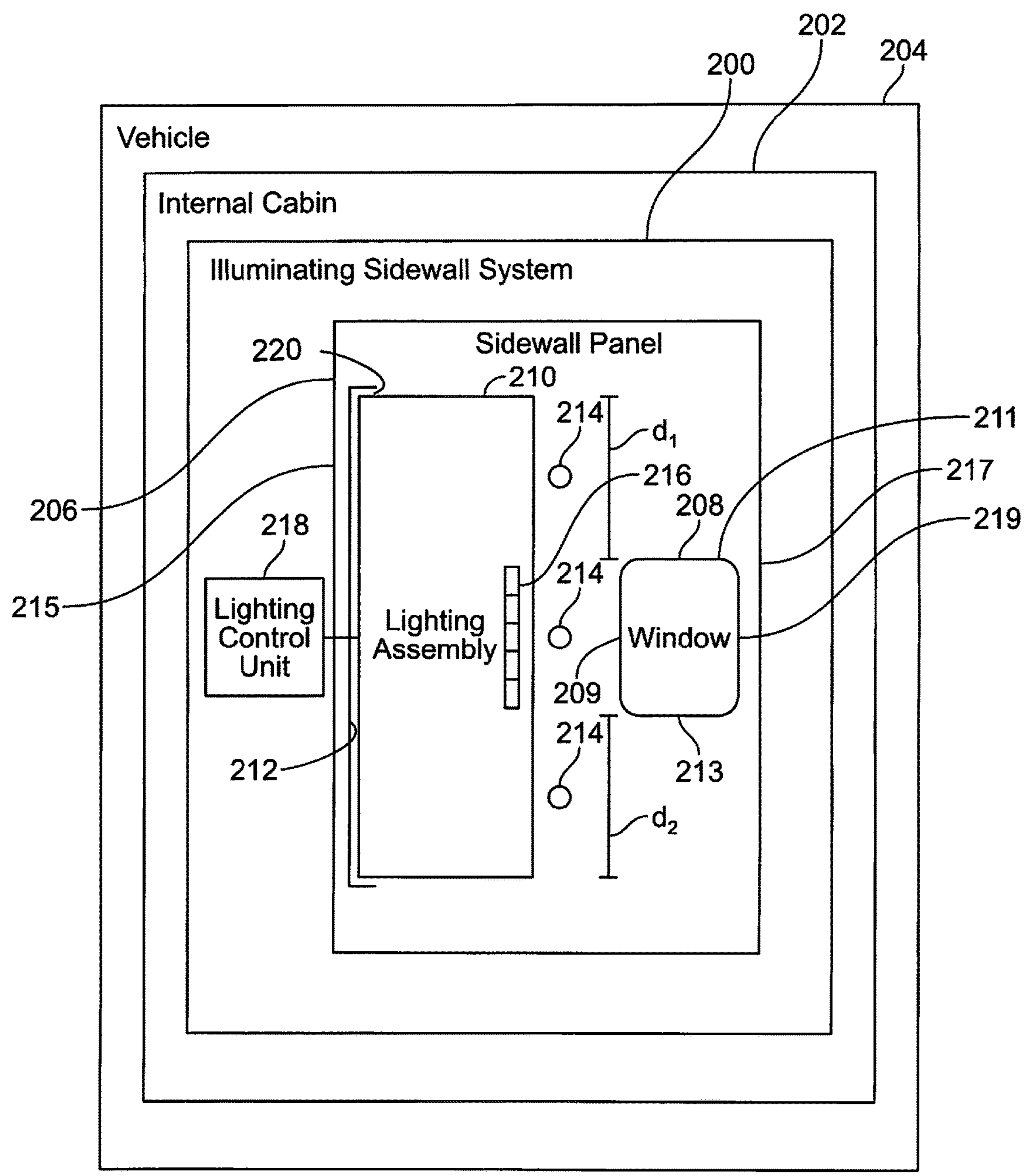
FIG. 4 illustrates a schematic block diagram of an illuminating sidewall system within an internal cabin of a vehicle, according to an embodiment of the present disclosure.

FIG. 4 illustrates a schematic block diagram of an illuminating sidewall system 200 within an internal cabin 202 of a vehicle 204, according to an embodiment of the present disclosure. The internal cabin 202 is an example of the internal cabin 100 shown in FIG. 3. The vehicle 204 may be a commercial aircraft, such as the aircraft 10 shown in FIG. 1.

The illuminating sidewall system 200 includes a sidewall panel 206. In at least one embodiment, the sidewall panel 206 forms at least part of an outboard sidewall of an internal cabin, such as the outboard sidewall 102 shown in FIG. 3. The sidewall panel 206 includes at least one window 208. The sidewall panel 206 may include one window 208, or multiple windows 208. In at least one embodiment, the sidewall panel 206 may form an entire outboard sidewall of the internal cabin 202.

The window 208 may be or include an opening. That is, the window 208 may or may not include a solid window panel and/or frame. In at least one embodiment, a fuselage of a vehicle is formed from frames, stringers, skins, and/or the like. A window belt area of a fuselage is a reinforced area that is configured to retain a transparent window panel(s), for example. Insulation blankets are secured over portions of the panels, and the sidewall panel(s) 206 are secured over the insulation blankets and internal portions of the fuselage. As such, the sidewall panel 206 may be a decorative structure including the window 208 (which may be an opening that overlies a window belt area of a fuselage) that secures to an underlying structure, such as portions of the fuselage and/or insulation blankets.

A lighting assembly 210 is mounted in relation to the sidewall panel 206 (such as mounted within an end of the sidewall panel 206) on and/or away from a side 209 of the window 208. The lighting assembly 210 may be vertically-oriented and laterally spaced apart from the side 209 of the window 208. Optionally, the lighting assembly 210 may abut into the side 209 of the window 208. The lighting assembly 210 is positioned to the side 209 of the window 208 and may extend a distance $d_1$ above a top 211 of the window 208, and a distance $d_2$ below a bottom 213 of the window 208. The distances $d_1$ and $d_2$ may be greater or lesser than shown. For example, the lighting assembly 210 may not extend the distance $d_2$. In at least one other embodiment, the lighting assembly 210 may not extend the distance $d_1$. In at least one embodiment, the lighting assembly 210 may be aligned with and extend the same height as the side 209 of the window 208.

The lighting assembly 210 is disposed at or towards a first end 215 of the sidewall panel 206, which is opposite a second end 217. The first end 215 may be a fore end in that it is closer to a front of a vehicle, while the second end 217 may be an aft end in that it is closer to a rear of a vehicle. Optionally, the first end 215 may be the aft end, and the second end 217 may be the fore end.

In at least one embodiment, the lighting assembly 210 may include a second lighting assembly positioned to an opposite side 219 of the window 208. That is, the illuminating sidewall system 200 may include two lighting assemblies 210, one of each disposed in relation to the opposite sides 209 and 219 of the window 208.

The lighting assembly 210 may be securely retained within a channel 212 formed in the sidewall panel 206. For example, the channel 212 may be a pocket, recess, and/or bracket formed in the sidewall panel 206. The lighting assembly 210 may be secured within the channel 212 through one or more fasteners, adhesives, and/or the like. The channel 212 includes an open aperture 220. Light emitted by the lighting assembly 210 is emitted out of the open aperture 220 towards the window 208, such as towards and onto portions of the sidewall panel 206 surrounding the side 209, the top 211, and/or the bottom 213.

In at least one embodiment, the lighting assembly 210 is separate and distinct from a PSU, such as the PSUs 114 shown in FIG. 3. That is, the lighting assembly 210 is separate and distinct from light emitting devices of the PSUs. In at least one embodiment, the lighting assembly 210 is outboard from the PSU 114.

The lighting assembly 210 may be mounted behind a portion of the sidewall panel 206 and configured to emit light through at least one light-transmissive indicia 214 that allows emitted light to pass therethrough. The lighting assembly 210 is configured to emit light through the light-transmissive indicia 214. Because at least a portion of the lighting assembly 210 may be positioned behind the light-transmissive indicia 214, the lighting assembly 210 may be configured to backlight the light-transmissive indicia 214. The light-transmissive indicia 214 may be or include one or more of a wayfinding indicia (such as a seat number), text, graphics, and/or the like, such as which may be used for company branding purposes. The illuminating sidewall system 200 may include more or less light-transmissive indicia 214 than shown. In at least one embodiment, the illuminating sidewall system 200 may not include the light-transmissive indicia 214.

The lighting assembly 210 includes one or more light-emitting elements 216, such as light-emitting diodes (LEDs) that are configured to be operated to emit light that may be selectively changed between different colors (such as red-orange-yellow-green-blue-indigo, violet, and mixes of colors therebetween). In at least one embodiment, a single light-emitting element 216 may be used. For example, a single tubular lighting element may be encased in a tubular transparent cover. In at least one other embodiment, multiple light-emitting elements may be used.

The lighting assembly 210 may be operatively coupled to a lighting control unit 218, such as through one or more wired or wireless connections. The lighting control unit 218 may be secured to the sidewall panel 206. Optionally, the lighting control unit 218 may be remotely located from the sidewall panel 206. For example, the lighting control unit 218 may be within another portion of the internal cabin 202, such as within a cockpit, galley station, or the like. The lighting control unit 218 may be in communication with a lighting assembly 210 of a plurality of sidewall panels 206 within the internal cabin 202. Alternatively, the lighting control unit 218 may be in communication with a lighting assembly 210 of only one sidewall panel 206. Examples of lighting assemblies are shown and described in U.S. Pat. No. 9,527,437, entitled "Lighting Assembly for Internal cabin of a Vehicle," which is hereby incorporated by reference in its entirety.

The lighting assembly 210 is disposed to the side 209 the window 208, as shown in FIG. 4. The lighting assembly 210 may be a linear lighting assembly 210 positioned to the side 209 of one or more windows 208. Optionally, the lighting assembly 210 may be curved, circular, and/or the like. In at least one embodiment, the lighting assembly 210 includes a flexible, transparent housing that retains the plurality of light-emitting elements 216. In this manner, the lighting assembly 210 fits within the channel 212 and conforms to the contours of the sidewall panel 206.

In operation, the lighting control unit 218 controls operation of the lighting assembly 210. For example, an individual may select a color of light to be emitted by the light-emitting element(s) 216, and activate the light-emitting element(s) 216 via an interface coupled to the lighting control unit 218. Light emitted by the lighting assembly 210 is directed laterally towards and onto the side 209 (and optionally, the top 208 and bottom 213) of the window 208. Further, the emitted light from the lighting assembly 210 may be emitted through the light-transmissive indicia 214.

Accordingly, the lighting assembly 210 is used to provide light having desired properties (for example, desired color(s) and effect(s)) around portions of the window 208. The properties (for example, color, intensity, luminosity, radiance, flickering, timed staggering of light-emitting elements 216 to provide motion effects, and/or the like) of the light may be customized and controlled through the lighting control unit 218.

As used herein, the term "control unit," "central processing unit," "unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the lighting control unit 218 may be or include one or more processors that are configured to control operation of the lighting assembly 210, as described herein.

The lighting control unit 218 is configured to execute a set of instructions that are stored in one or more data storage units or elements (such as one or more memories), in order to process data. For example, the lighting control unit 218 may include or be coupled to one or more memories. The data storage units may also store data or other information as desired or needed. The data storage units may be in the form of an information source or a physical memory element within a processing machine.

The set of instructions may include various commands that instruct the lighting control unit 218 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein illustrate one or more control or processing units, such as the lighting control unit 218. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the lighting control unit 218 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 5:
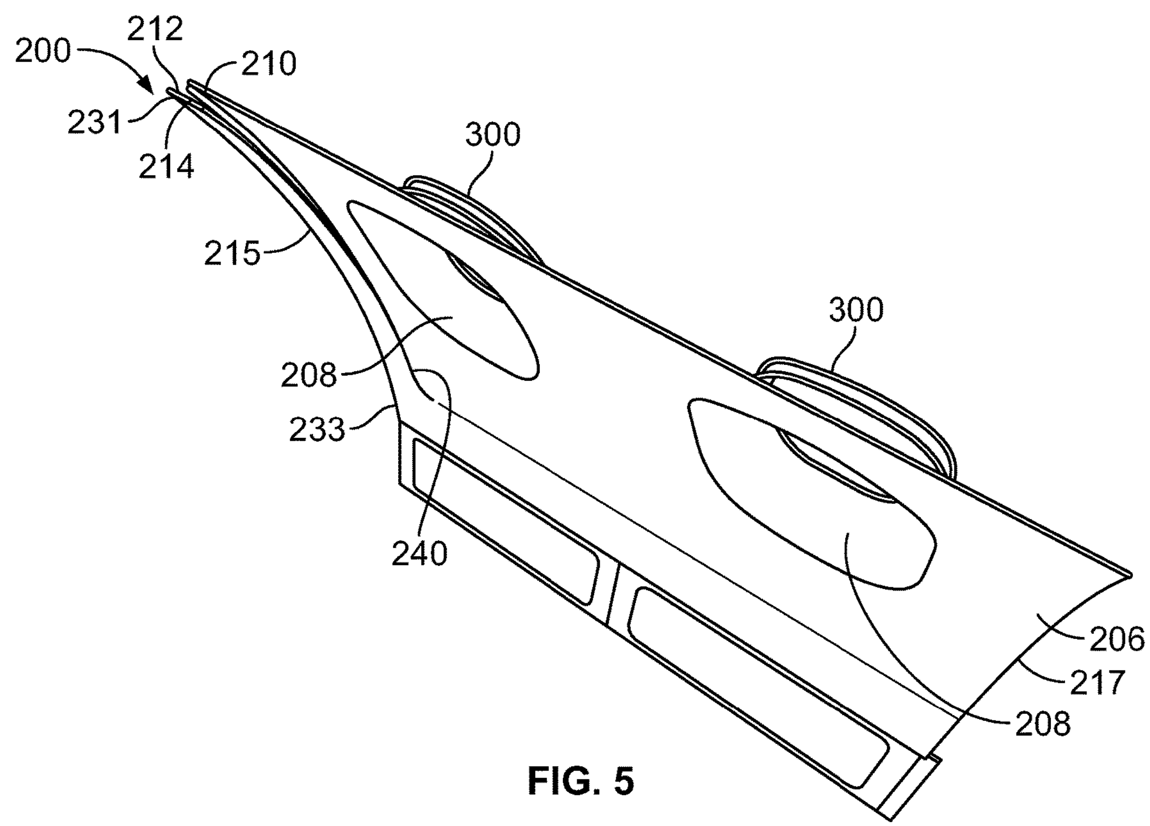
FIG. 5 illustrates a perspective top view of an illuminating sidewall system, according to an embodiment of the present disclosure.
Figure 6:
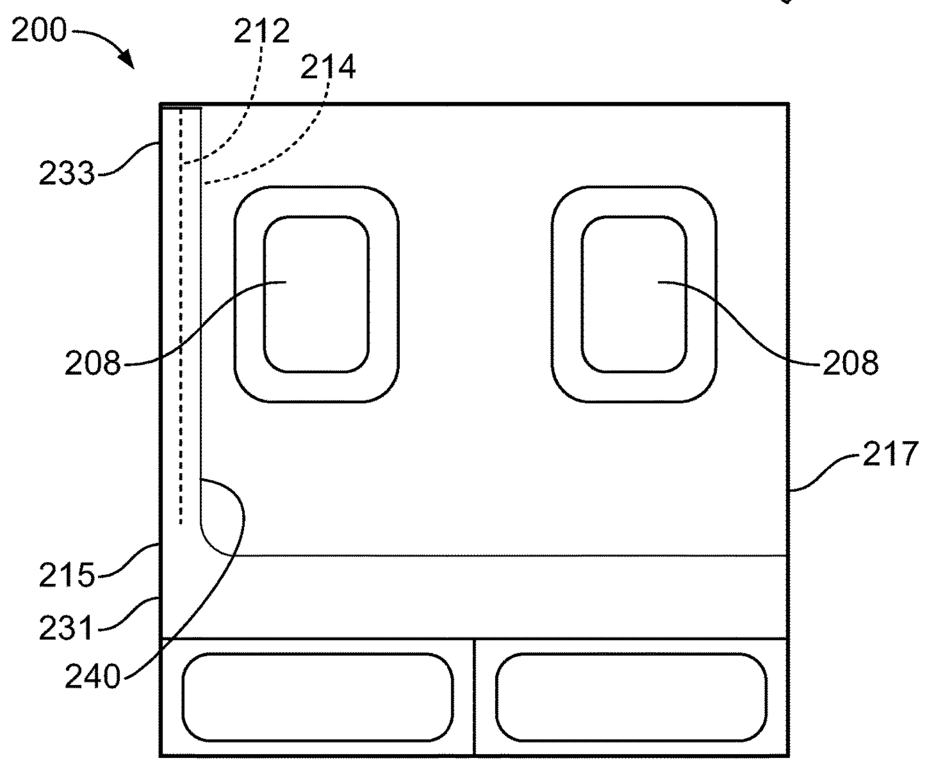
FIG. 6 illustrates a front view of an illuminating sidewall system, according to an embodiment of the present disclosure.
Figure 7:
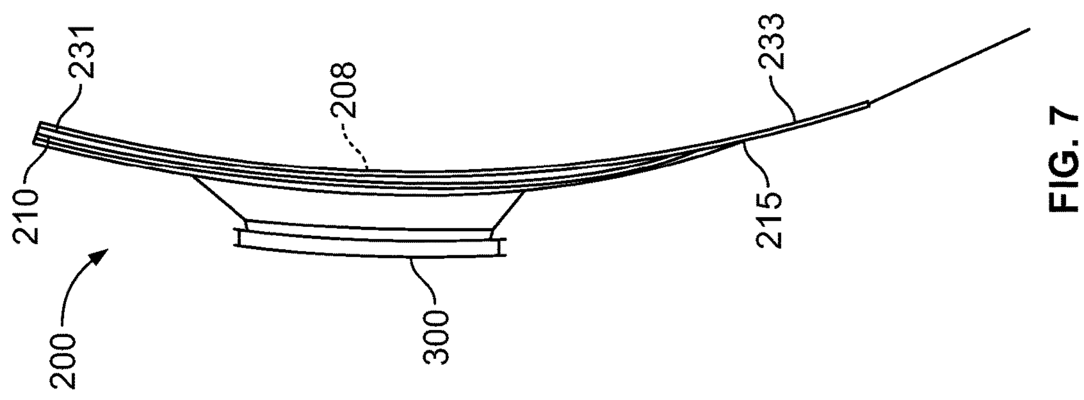
FIG. 7 illustrates an end view of an illuminating sidewall system, according to an embodiment of the present disclosure.

FIG. 5 illustrates a perspective top view of the illuminating sidewall system 200, according to an embodiment of the present disclosure. FIG. 6 illustrates a front view of the illuminating sidewall system 200. FIG. 7 illustrates an end view of the illuminating sidewall system 200. Referring to FIGS. 5-7, the sidewall panel 206 includes the windows 208, which may be openings that overlay window panel assemblies 300, which may be secured to a fuselage of a vehicle. Alternatively, the windows 208 may include the window panel assemblies 300. The sidewall panel 206 may include more or less windows 208 than shown. For example, the sidewall panel 206 may include three or more windows 208, or only one window 208.

The lighting assembly 210 is secured proximate to the end 215 of the sidewall panel 206. The lighting assembly 210 is mounted within the channel 212, which may be a pocket formed in the sidewall panel 206. The aperture 220 may extend along the channel 212. The width of the aperture 220 may be constant along the channel 212. In at least one other embodiment, a width of the aperture may be greatest proximate a top 231 and decrease towards a bottom 233, which may alter one or more properties (such as a focus) of the light emitted from the lighting assembly 210.

As shown, the lighting assembly 210 may be secured within the channel 212 proximate (such as at or within) a scalloped internal edge 240 of the sidewall panel 206. In this manner, the lighting assembly 210 may be discretely mounted and inwardly recessed from the scalloped internal edge 240. That is, the lighting assembly 210 may be hidden within the pocket formed by the channel 212, which is inwardly recessed from the scalloped internal edge 240.

Figure 8:
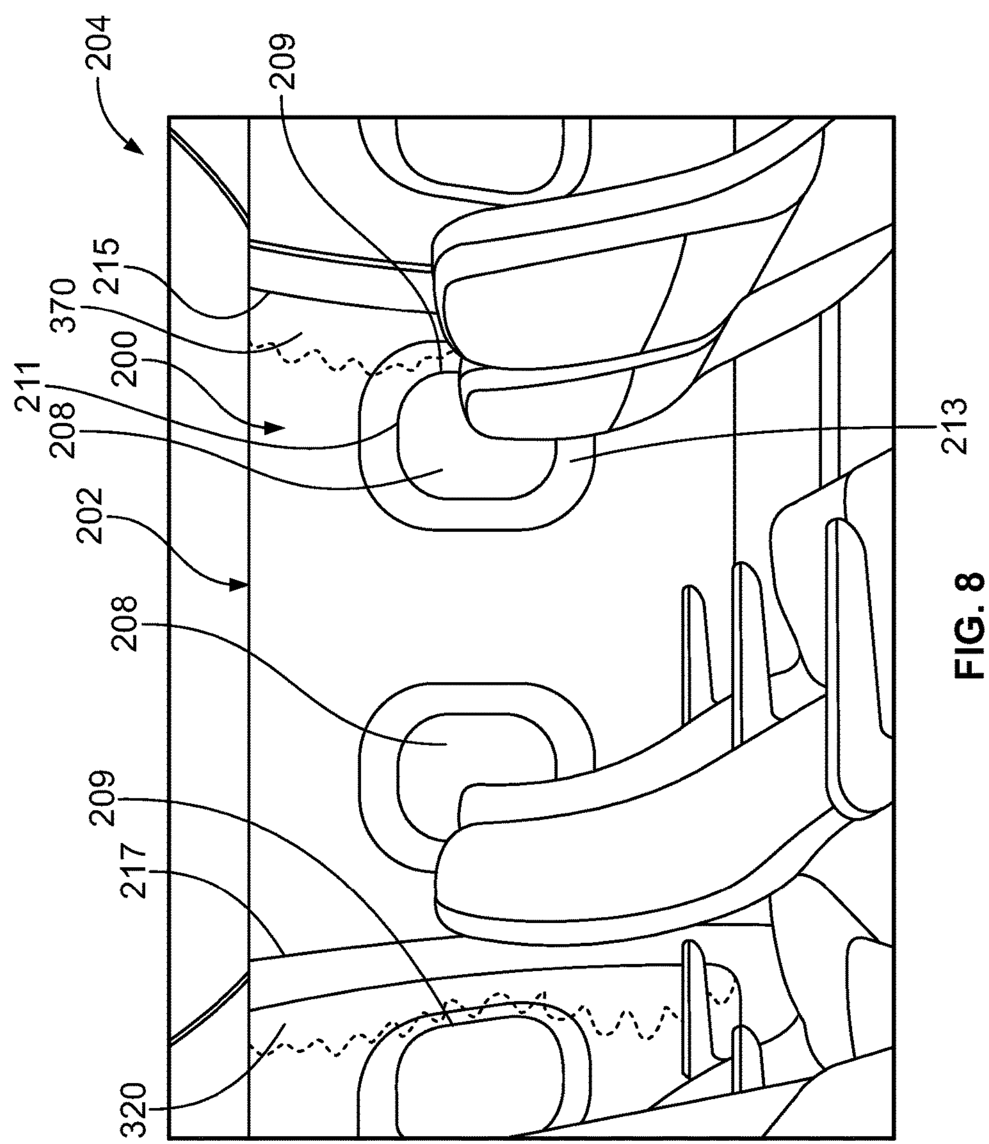
FIG. 8 illustrates a perspective internal view of an internal cabin of a vehicle, according to an embodiment of the present disclosure.

FIG. 8 illustrates a perspective internal view of an internal cabin 202 of a vehicle 204, according to an embodiment of the present disclosure. As shown, the lighting assemblies 210 (shown in FIGS. 4-7) emit light 320 towards the sides 209 of the windows 208, thereby providing illuminated effects at and/or around the sides 209, and optionally proximate to the tops 211 and bottoms 213 of the windows 208. As indicated, lighting assemblies 210 may also (or alternatively) be disposed at opposite ends 217 of the illuminating sidewall panels 206.

Figure 9:
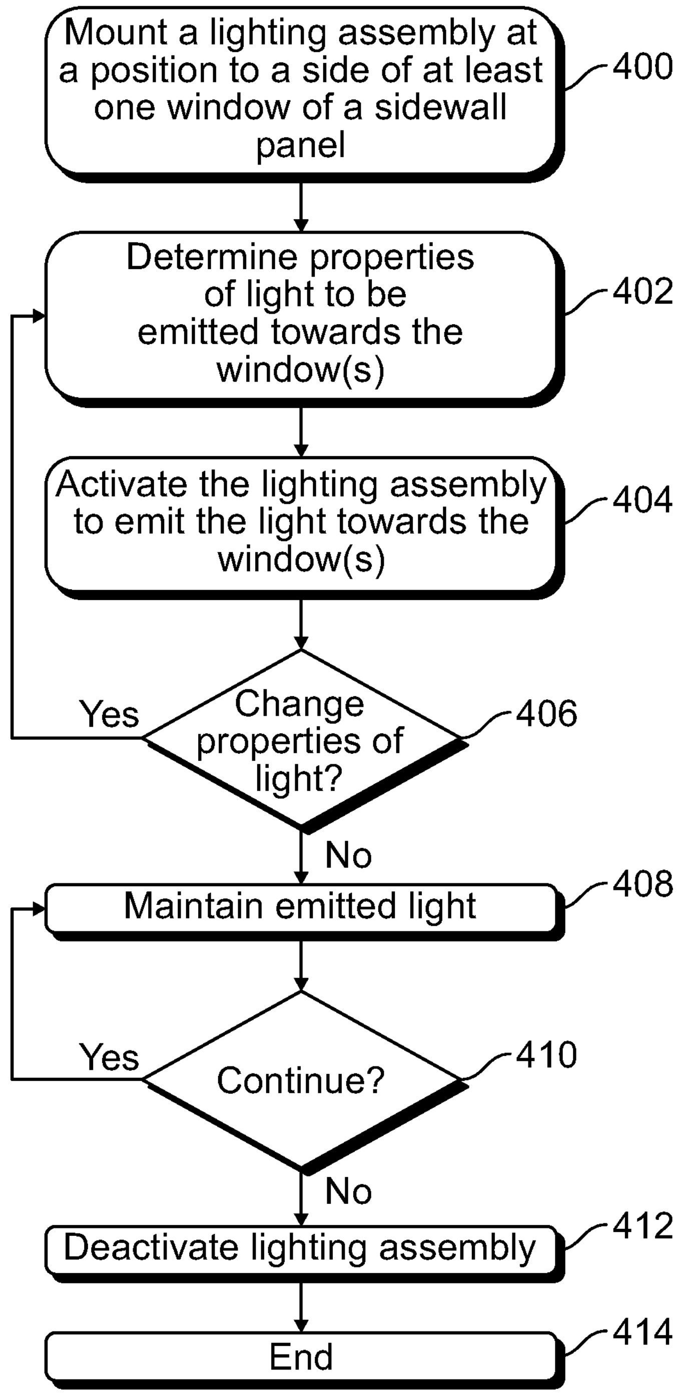
FIG. 9 illustrates a flow chart of a method of operating an illuminating sidewall system, according to an embodiment of the present disclosure.

FIG. 9 illustrates a flow chart of a method of operating an illuminating sidewall system, according to an embodiment of the present disclosure. Referring to FIGS. 4-9, the method begins at 400, at which the lighting assembly 210 is mounted at a position to a side of at least one window 208 of the sidewall panel 206. At 402, an individual determines desired properties (such as color, intensity, luminosity, radiance, motion effects, and/or the like) of light to be emitted towards the side 209 of the window 208. At 404, the light assembly 210 is activated (such as via a user interface coupled to the lighting control unit 218) to emit the light towards the window(s) 208.

At 406, an individual decides whether or not to change the properties of the emitted light. If the individual does decide to change one or more properties of the light, the method returns to 402.

If, however, the individual does not wish to change the properties of the light, the method proceeds from 406 to 408, at which the emitted light is maintained. Then, at 410, the individual determines whether or not to continue the lighting effects. If the lighting effects are to continue, the method returns to 408. If, however, the lighting effects are to cease, the method proceeds from 410 to 412, at which the lighting assembly 210 is deactivated (such as through the user interface coupled to the lighting control unit 218), and then the method ends at 414.

As described herein, embodiments of the present disclosure provide systems and methods of adaptively modifying sidewalls within an internal cabin of a vehicle, such as through one or more lighting effects. Further, embodiments of the present disclosure provide systems and methods that allow for adaptive customization of portions of sidewalls within an internal cabin of an aircraft.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An illuminating sidewall system for an internal cabin of a vehicle, the illuminating sidewall system comprising:

a sidewall panel including at least one window; and a lighting assembly mounted to the sidewall panel at a side of the at least one window, wherein the lighting assembly is configured to emit light in a direction towards the at least one window and onto the sidewall panel.

2. The illuminating sidewall system of claim 1, wherein the lighting assembly is vertically oriented.

3. The illuminating sidewall system of claim 1, wherein the lighting assembly is spaced apart from the side of the at least one window.

4. The illuminating sidewall system of claim 1, wherein the lighting assembly extends one or both of a first distance above a top of the window and a second distance below a bottom of the window.

5. The illuminating sidewall system of claim 1, wherein the lighting assembly is disposed at or towards a fore end or an aft end of the sidewall panel.

6. The illuminating sidewall system of claim 1, wherein the lighting assembly is securely retained within a channel formed in the sidewall panel.

7. The illuminating sidewall system of claim 1, wherein the lighting assembly is separate and distinct from a personal service unit.

8. The illuminating sidewall system of claim 1, wherein the sidewall panel comprises at least one light-transmissive indicia, wherein at least a portion of the lighting assembly is positioned behind the light-transmissive indicia, and wherein the lighting assembly is configured to emit the light through the light-transmissive indicia.

9. The illuminating sidewall system of claim 1, wherein the lighting assembly comprises one or more light emitting diodes (LEDs).

10. The illuminating sidewall system of claim 1, wherein the lighting assembly is inwardly recessed from a scalloped internal edge of the sidewall panel.

11. The illuminating sidewall system of claim 1, further comprising a lighting control unit that is coupled to the lighting assembly, wherein the lighting control unit is configured to control operation of the lighting assembly.

12. A vehicle comprising:

an internal cabin; and an illuminating sidewall system within the internal cabin, the illuminating sidewall system comprising:

a sidewall panel including at least one window and a channel, the sidewall panel defining a scalloped internal edge;

a vertically-oriented lighting assembly mounted at or towards a fore end or an aft end of the sidewall panel at a side of the at least one window; and, a lighting control unit configured to control the operation of the lighting assembly, wherein the lighting assembly is securely retained within the channel and is inwardly recessed from the scalloped internal edge such that the lighting assembly extends a first distance above a top of the window and a second distance below a bottom of the window, wherein the lighting assembly is further configured to emit light in a direction towards the at least one window and onto the sidewall panel.

13. An illuminating sidewall method for an internal cabin of a vehicle, the illuminating sidewall method comprising the steps of:

providing a sidewall panel including at least one window;

mounting a lighting assembly to the sidewall panel at a side of the at least one window; and emitting light from the lighting assembly in a direction towards the at least one window and onto the sidewall panel.

14. The illuminating sidewall method of claim 13, wherein the mounting comprises:

vertically orienting the lighting assembly; and spacing the lighting assembly apart from the side of the at least one window.

15. The illuminating sidewall method of claim 13, wherein the mounting comprises extending the lighting assembly one or both of a first distance above a top of the window and a second distance below a bottom of the window.

16. The illuminating sidewall method of claim 13, wherein the mounting comprises disposing the lighting assembly at or towards a fore end or an aft end of the sidewall panel.

17. The illuminating sidewall method of claim 13, wherein the mounting comprises securing the lighting assembly within a channel formed in the sidewall panel.

18. The illuminating sidewall method of claim 13, wherein the lighting assembly is separate and distinct from a personal service unit.

19. The illuminating sidewall method of claim 13, further comprising emitting the light from the lighting assembly through a light-transmissive indicia of the sidewall panel.

20. The illuminating sidewall method of claim 13, wherein the mounting comprises inwardly recessing the lighting assembly from a scalloped internal edge of the sidewall panel.

* * * * *